United States Patent
Masingale

(10) Patent No.: US 7,090,112 B2
(45) Date of Patent: Aug. 15, 2006

(54) METHOD AND SEALANT FOR JOINTS

(75) Inventor: Don Masingale, Derby, KS (US)

(73) Assignee: The Boeing Company, Chicago, IL (US)

( * ) Notice: Subject to any disclaimer, the term of this patent is extended or adjusted under 35 U.S.C. 154(b) by 312 days.

(21) Appl. No.: 10/657,775

(22) Filed: Aug. 29, 2003

(65) Prior Publication Data

US 2004/0041006 A1   Mar. 4, 2004

(51) Int. Cl.
*B23K 20/12*   (2006.01)
*B23K 31/02*   (2006.01)

(52) U.S. Cl. .................... 228/112.1; 228/113; 228/114; 228/234.3

(58) Field of Classification Search ...................... None
See application file for complete search history.

(56) References Cited

U.S. PATENT DOCUMENTS

| | | | |
|---|---|---|---|
| 2,232,647 A | 2/1941 | Zirkman | |
| 2,235,904 A | 3/1941 | Schulz | |
| 2,407,190 A | 9/1946 | Tait | |
| 3,233,312 A * | 2/1966 | Cowan et al. | 428/614 |
| 3,890,168 A | 6/1975 | Shumway | |
| 3,899,306 A * | 8/1975 | Knopp et al. | 428/652 |
| RE29,879 E | 1/1979 | Cranston et al. | |
| 4,578,123 A | 3/1986 | Schultz et al. | |
| 4,587,161 A | 5/1986 | Barrell et al. | |
| 4,640,816 A | 2/1987 | Atzmon et al. | |
| 4,689,104 A | 8/1987 | Lavendel et al. | |
| 4,737,384 A | 4/1988 | Murthy et al. | |
| 4,738,389 A | 4/1988 | Moshier et al. | |
| 4,767,800 A | 8/1988 | Neu et al. | |
| 4,803,022 A | 2/1989 | Barrell et al. | |
| 4,871,708 A | 10/1989 | Baldi | |
| 4,879,452 A | 11/1989 | Kovarik et al. | |
| 4,889,324 A | 12/1989 | Brosnan et al. | |
| 5,028,385 A | 7/1991 | Baldi | |
| 5,160,390 A | 11/1992 | Yukumoto et al. | |
| 5,242,098 A * | 9/1993 | Hardwick | 228/107 |
| 5,298,092 A | 3/1994 | Schriever | |
| 5,376,421 A | 12/1994 | Sekhar et al. | |
| 5,378,293 A | 1/1995 | Schriever | |
| 5,381,944 A | 1/1995 | Makowiecki et al. | |

(Continued)

FOREIGN PATENT DOCUMENTS

EP   0 875 330 A1   4/1998

(Continued)

OTHER PUBLICATIONS

Search Report of EP 03 02 7702, dated Dec. 9, 2004.

(Continued)

*Primary Examiner*—Lynne R. Edmondson
(74) *Attorney, Agent, or Firm*—Alston & Bird LLP

(57) ABSTRACT

A joint between one or more structural members and an associated method are provided. The joint includes a friction weld joint or other connection between faying surfaces of the members, and an exothermically reacted sealant disposed in an interface defined by the faying surfaces. The exothermic reaction of the sealant in the interface can be initiated before, during, or after joining the structural members such that the sealant at least partially seals the interface. The sealant can fill the spaces between the structural members to prevent the entry of chemicals, moisture, debris, and other substances, thereby reducing the likelihood of corrosion of the joint or structural members at the interface. Further, the sealant can form a bond with the structural members, thereby increasing the strength of the connection between the members.

63 Claims, 4 Drawing Sheets

U.S. PATENT DOCUMENTS

| | | | |
|---|---|---|---|
| 5,411,606 A | | 5/1995 | Schriever |
| 5,415,687 A | | 5/1995 | Schriever |
| 5,460,317 A | | 10/1995 | Thomas et al. |
| 5,468,307 A | | 11/1995 | Schriever |
| 5,472,524 A | | 12/1995 | Schriever |
| 5,487,949 A | | 1/1996 | Schriever |
| 5,490,911 A | | 2/1996 | Makowiecki et al. |
| 5,538,795 A | | 7/1996 | Barbee, Jr. et al. |
| 5,547,715 A | | 8/1996 | Barbee, Jr. et al. |
| 5,551,994 A | | 9/1996 | Schriever |
| 5,670,033 A | | 9/1997 | Burgess et al. |
| 5,855,965 A | * | 1/1999 | Molerus et al. ............. 427/475 |
| 5,873,953 A | | 2/1999 | Schriever |
| 5,902,498 A | | 5/1999 | Mistry et al. |
| 5,967,402 A | * | 10/1999 | Kuwabara .................. 228/194 |
| 5,967,492 A | | 10/1999 | Navratil et al. |
| 6,045,028 A | | 4/2000 | Martin et al. |
| 6,177,189 B1 | | 1/2001 | Rawlings et al. |
| 6,187,508 B1 | | 2/2001 | Andriessen et al. |
| 6,248,184 B1 | | 6/2001 | Dull et al. |
| 6,308,882 B1 | * | 10/2001 | Shuster et al. ............. 228/175 |
| 6,357,332 B1 | | 3/2002 | Vecchio |
| 6,432,225 B1 | | 8/2002 | Schriever |
| 6,534,194 B1 | * | 3/2003 | Weihs et al. ................ 428/635 |
| 6,543,670 B1 | | 4/2003 | Mahoney |
| 2001/0038029 A1 | | 11/2001 | Weihs et al. |
| 2001/0046597 A1 | | 11/2001 | Weihs et al. |
| 2002/0012624 A1 | | 1/2002 | Figueroa et al. |
| 2002/0182436 A1 | | 12/2002 | Weihs et al. |
| 2003/0042291 A1 | | 3/2003 | Mahoney |
| 2004/0173662 A1 | | 9/2004 | Christner |
| 2004/0265503 A1 | * | 12/2004 | Clayton et al. ............. 427/446 |

FOREIGN PATENT DOCUMENTS

| | | | |
|---|---|---|---|
| FR | 622 098 A | | 5/1927 |
| JP | 54-139141 | | 10/1979 |
| JP | 61-99585 | | 5/1986 |
| JP | 62021479 A | | 1/1987 |
| JP | 3263781 | | 11/1991 |
| JP | 04157082 A | | 5/1992 |
| JP | 5305447 | | 11/1993 |
| JP | 10-263849 | | 10/1998 |
| JP | 2000 042759 A | | 2/2000 |
| JP | 2002113583 A | | 4/2002 |
| WO | WO 01/83182 A1 | * | 11/2001 |

OTHER PUBLICATIONS

Ellen McCarthy; *From Concept to Market: New Bonding Method Is Ready To Go*; TechNews; Monday, Jun. 24, 2002; p. E05; The Washington Post; http://www.washingtonpost.com/ac2/wp-dyn.

Stephen Wampler; *Lawrence Livermore and Reactive Nano Technologies Announce Exclusive License Agreement*; Dec. 4, 2002; two pages; Lawrence Livermore National Laboratory; http://www.llnl.gov/lln/06news/NewsReleases.

Will Wingfield; *Incubator of the Year: Thinking small in big market*; Jun. 25, 2003; two pages; Washington Business Journal; http://www.potomactechjournal.com.

Jon Goldstein; *A better bond*; Aug. 26, 2002; five pages; Sun Trust; http://www.sunspot.net.

Nicholas Griner; *Hopkins profs put nanotechnology to the test*; Jan. 14, 2002; Washington Business Journal; three pages; http://www.potomactechjournal.com; one page.

Products & Technology—RNT: *RNT Joining Technology*; http://rntfoil.com/rnt-foils/technology.html; one page.

Metal/Ceramic Joining—RNT; *RNT Foil Applications*; http://rntfoil.com/rnt-foils/metal-ceramic-joining.html; one page.

* cited by examiner

METHOD AND SEALANT FOR JOINTS

BACKGROUND OF THE INVENTION

1) Field of the Invention

The present invention relates to the joining of structural members and, more particularly, relates to the sealing of joints between structural members, for example, to increase the strength and corrosion-resistance of the members.

2) Description of Related Art

The joining of structural members often results in an interface that is susceptible to intrusion by chemicals, moisture, or other fluids and particulates. For example, in the aircraft industry, joints between structural members are often formed by overlapping two or more structural members, forming holes through the members, and disposing rivets or other fasteners through the holes. Although the overlapping members may correspond closely to one another at their interface, each interface nevertheless typically defines a narrow space or crevice-like gap through which moisture, chemicals, debris, and other foreign materials can be received, possibly resulting in increased corrosion of the structural members and the fasteners. Therefore, a sealant such as a caulk-like organic material can be disposed in each interface to seal the interface and prevent the entry of foreign materials therein. The sealant can be disposed before or after the joint is formed, though in some cases the sealant is preferably disposed before joining because the geometrical configuration of the structural members may prevent access to one or both sides of the interface after joining. In some cases, the sealant may be squeezed from the interface during joining, leaving unfilled voids in the interface, which can be difficult to identify and fill, especially if one or both sides of the joint cannot be accessed after joining. Further, even if the sealant does fill the interface, the sealant can dry out and deteriorate or otherwise work free from the joint over time.

Joints can alternatively be formed by welding the structural members. For example, a friction stir weld joint can be formed by overlapping the structural members, rotating a friction stir welding pin extending in a direction generally perpendicular to the interface of the members, and urging the pin through the members along the interface. The pin generates sufficient friction with the structural members to plasticize a portion of the members, and the plasticized material is mixed by the pin. As the plasticized material cools, a friction stir weld joint is formed, characterized by a mixed portion having a refined grain structure, referred to as a nugget. The nugget is typically not as wide as the interface of the overlapping members, and the members therefore define spaces in the interface in which corrosion can occur, similar to the space proximate to the rivet joints described above. A sealant can be disposed in the spaces; however, if the sealant is disposed before welding, care should be taken to avoid introducing the sealant into the nugget of the joint as conventional sealants can negatively impact the strength and/or corrosion resistance of the joint. For example, masking tape can be placed on the area of the structural members where the nugget will be formed, the sealant can be disposed on the structural members, and the masking tape can then be removed to generally leave a clean area for forming the nugget. This process is time consuming. Further, even if such precautions are taken, as the members are placed and urged together to form the joint, some of the sealant can be squeezed into the interface and mixed with the plasticized material of the joint, thereby reducing the quality of the weld joint. In addition, as described above, voids can result in the interface during joining or the sealant can be loosened from the interface subsequently.

Thus, there exists a need for an improved method for forming a corrosion resistant joint in a structural member. The method should be compatible with welded methods, such as friction welding, and should not be overly time consuming. Further, the method should result in a strong bond between the structural members without excessively reducing the quality of the joint.

BRIEF SUMMARY OF THE INVENTION

The present invention provides a sealed joint and a method for forming a joint between structural members. A sealant formed of an exothermic material is disposed in an interface between faying surfaces of the structural members and reacted to form a seal and/or a bond in the interface. The sealant can fill the spaces between the structural members to prevent the entry of chemicals, moisture, debris, and other substances, thereby reducing the likelihood of corrosion of the joint or structural members at the interface. Further, the sealant can be reacted before, during, or after the formation of a joint, such as a friction stir weld joint, between the members.

According to one embodiment of the present invention, the joint is formed by disposing the sealant in the interface and exothermically reacting the sealant in the interface. The structural members, which can be formed of a variety of materials including aluminum, aluminum alloys, titanium, titanium alloys, steel, and the like, are friction welded to form a joint between the faying surfaces, with the joint being least partially sealed by the sealant.

The sealant, which can include aluminum, nickel, oxygen, or other materials, can be disposed as a foil, such as a multilayer foil, or as a fluid that can include a plasticizer. Further, the sealant can be provided on a substrate that is then used to dispose the sealant onto one or both of the faying surfaces. The sealant can be disposed with a thickness of between about 0.0005 and 0.020 inches, and some of the sealant can be reacted outside the interface to form a fillet seal on one or more edges of the interface. For example, the faying surfaces can be urged together before the sealant is reacted so that some of the sealant is squeezed from the interface and subsequently exothermically reacted to form a seal on at least one edge of the interface.

The exothermic reaction of the sealant can be initiated by heating the sealant to an initiation temperature, and can be initiated before, during, or after friction welding the structural members. For example, friction stir welding of the structural members can heat the members to the initiation temperature and thereby start the exothermic reaction. The exothermic reaction of the sealant can have a maximum temperature that reaches or exceeds about 1200° F.

In addition, a braze material can be provided in the interface with the sealant. The braze material has a melting temperature that is generally lower than a melting temperature of the structural members so that the braze material is bonded to the faying surfaces during the exothermic reaction of the sealant. The braze material can include, e.g., bronze, copper, aluminum, or nickel.

According to other embodiments of the invention, other connections can be formed between the structural members and sealed. For example, the structural members can be joined by other types of friction welding such as linear friction welding, other types of welding such as laser welding or arc welding, connectors or fasteners such as rivets or bolts, or the like.

The present invention also provides a weld joint that connects first and second faying surfaces of one or more structural members formed of materials such as aluminum, aluminum alloys, titanium, titanium alloys, or steel. A friction weld joint connects the faying surfaces at the interface, and an exothermically reacted sealant in the interface at least partially seals the friction weld joint therein. The sealant, which can include materials such as aluminum, nickel, and oxygen, can substantially fill the interface. Further, the sealant can seal the faying surfaces outside the interface, e.g., as a fillet seal on the edges of the interface. The friction weld joint can be a friction stir welded joint having a nugget area characterized by a refined granular structure, and the friction weld joint can extend through the structural members in a direction substantially perpendicular to the interface. Further, a braze joint formed of bronze, copper, aluminum, nickel, or the like can be provided between the faying surfaces proximate to the friction weld joint such that the braze joint at least partially seals the interface.

BRIEF DESCRIPTION OF THE SEVERAL VIEWS OF THE DRAWINGS

Figure 1:
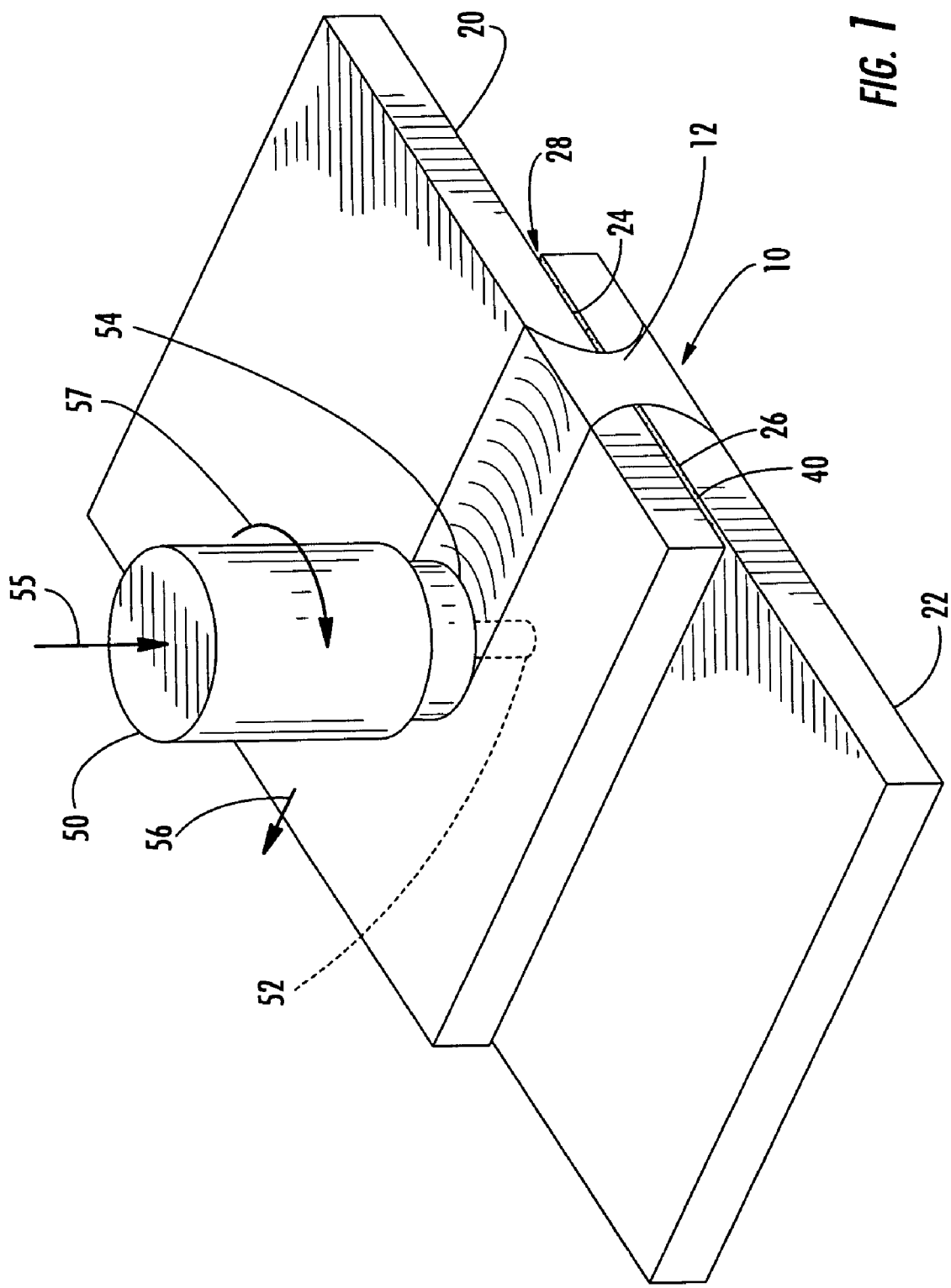
Figure 2:
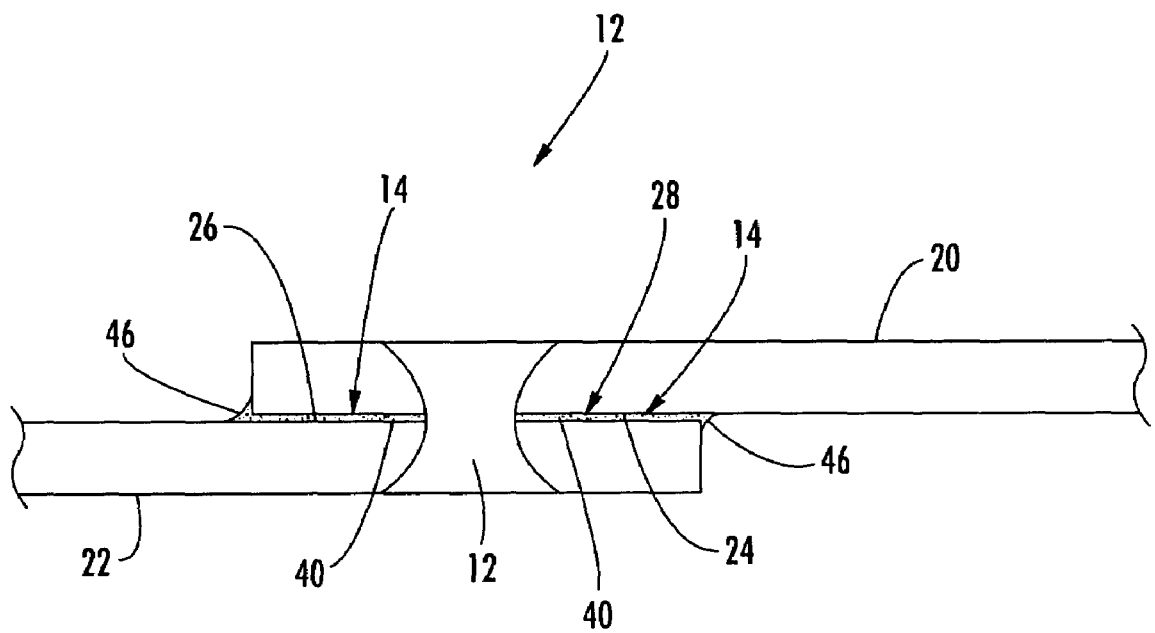
Figure 3:
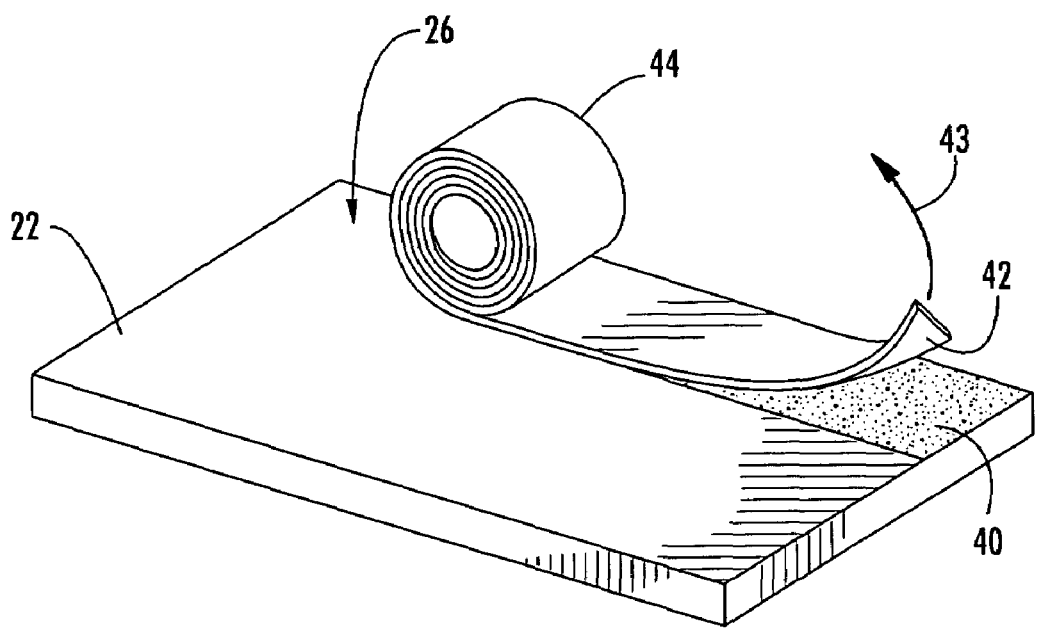
Figure 4:
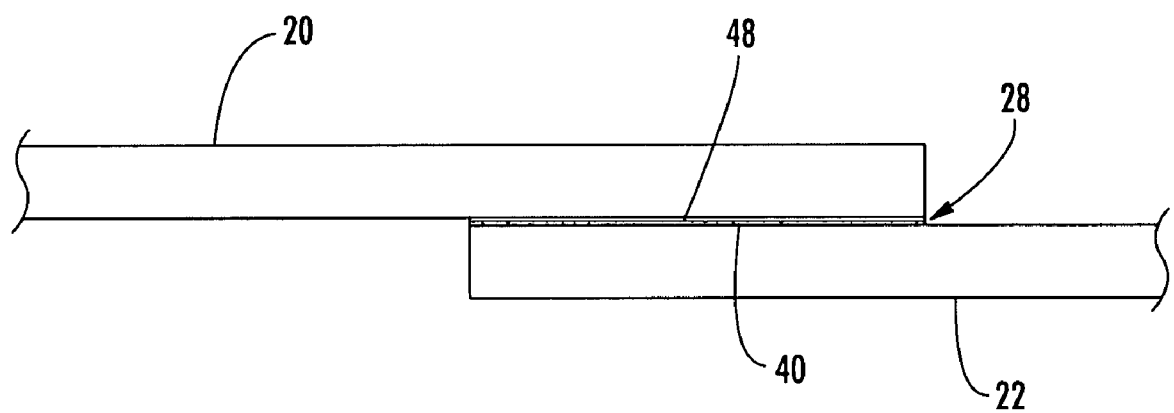
Figure 5:
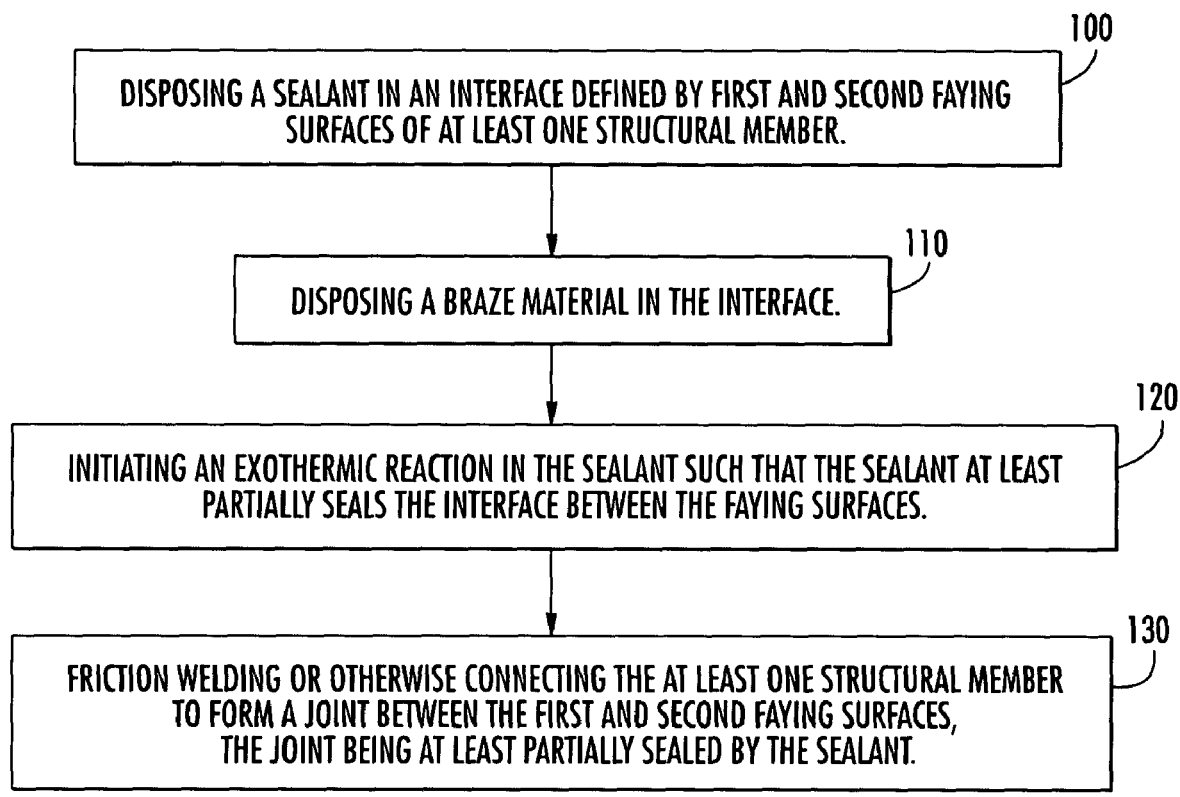

Having thus described the invention in general terms, reference will now be made to the accompanying drawings, which are not necessarily drawn to scale, and wherein:

FIG. 1 is a perspective view illustrating two structural members partially joined by a friction weld joint according to one embodiment of the present invention;

FIG. 2 is a section view in elevation of the weld joint between the structural members of FIG. 1;

FIG. 3 is a perspective view illustrating a sealant partially disposed on a structural member according to another embodiment of the present invention;

FIG. 4 is a section view in elevation of two structural members configured for joining according to another embodiment of the present invention; and FIG. 5 is a block diagram illustrating the operations for forming a joint according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, FIG. 1, there is shown an apparatus for forming a joint 10 to connect first and second structural members 20, 22. Two structural members are typically joined by the method of the present invention, but a single structural member can be joined, for example, a tubular member or otherwise curved member with adjoining edges. Alternatively, three or more structural members can be joined, and the structural members can be arranged in various configurations. As illustrated in FIG. 1, the first structural member 20 is disposed so that a faying surface 24 of the first structural member 20 overlaps a faying surface 26 of the second structural member 22 and the two structural members 20, 22 form an interface 28 therebetween. A friction welding tool is used to form a friction weld joint 12 between the structural members 20, 22. For example, the friction welding tool can be a friction stir welding tool 50 that includes a rotatable pin 52 extending from a shoulder 54. The pin 52 is inserted through the interface 28 generally perpendicular to the interface 28, e.g., at an angle of about 3–5° from a line normal to the interface 28. An anvil (not shown) or other support can be disposed against the second structural member 22 to oppose the friction stir weld tool 50. The friction stir welding tool 50 is then urged in a direction 55 against the first structural member 20 and advanced in a direction 56 along the interface 28 of the structural members 20, 22 as the pin 52 rotates in a direction indicated by reference numeral 57. The motion of the pin 52 generates frictional heat, which plasticizes material from the structural members 20, 22, and the plasticized material is mixed by the pin 52. As the plasticized material cools and hardens, the friction stir weld joint 12 is formed, the friction stir weld joint 12 comprising part of the joint 10 that connects the two structural members 20, 22 as shown in FIG. 2. The friction weld joint 12 includes a nugget region proximate to the path of the pin 52, the nugget region being characterized by a refined granular structure.

The process of friction stir welding for joining structural members 20, 22 is known in the art and is described, for example, in U.S. Pat. No. 5,460,317 to Thomas, et al., the entirety of which is incorporated herein by reference. The weld joint 12 formed by the configuration shown in FIG. 1 is generally referred to as a lap joint, i.e., a joint generally perpendicular to the interface of overlapping members. In other embodiments of the present invention, other weld joints can alternatively be formed by friction stir welding. In addition, other types of friction welding, such as linear friction welding, can also be used to join the members 20, 22, as can welding devices and methods other than friction welding devices and methods. For example, the weld joint 12 can be formed by any welding technique such as laser welding or arc welding and, more particularly, gas tungsten arc welding, tungsten inert gas welding, plasma arc welding, or the like. Further, the structural members 20, 22 can also be joined without welding, for example, by solder joints or braze joints. Alternatively, the structural members 20, 22 can be joined using connectors or fasteners including, e.g., rivets, bolts, screws, clips, crimps, and the like. The present invention is not limited to these or other types of joints, and instead can be used with a wide variety of joints for connecting structural members 20, 22.

The structural members 20, 22 can define any of a variety of shapes such as sheets, plates, blocks, and the like. The members 20, 22 can be formed of metals, such as aluminum, titanium, alloys thereof, or steel. Alternatively, the members 20, 22 can be formed of non-metallic materials, including polymers, composite materials, and the like. Further, the members 20, 22 can be formed of similar or dissimilar materials, i.e., each of the members 20, 22 can be formed of the same or different materials. For example, according to one embodiment of the invention, one of the members 20, 22 is formed of a metallic material and is joined to another one of the members 20, 22 that is formed of a non-metallic material. The members 20, 22 can be joined to create an assembly used for various applications including frames, panels, skins, airfoils, and the like for aeronautical and aerospace structures such as aircraft and spacecraft, for marine vehicles, automobiles, and the like. In some applications, the members 20, 22 are joined in geometrical configurations that make difficult, or prevent, subsequent access for inspecting or treating the joint 10. For example, the structural members 20, 22 can be overlapped and joined to form a partially or fully closed body such as a tube or an airplane wing.

Although the faying surfaces 24, 26 of the structural members 20, 22 can correspond closely in contour and the faying surfaces 24, 26 can be clamped tightly together, the interface 28 is characterized by spaces or voids 14 between the surfaces 24, 26 where the weld joint 12 is not formed, i.e., on either side of the weld joint 12. According to one embodiment of the present invention, a sealant 40 is disposed between the structural members 20, 22 at the interface 28 thereof. The sealant 40 can be disposed on one or both of the faying surfaces 24, 26 of the structural members 20, 22, and can be disposed over part or all of the area of the interface 28, including the region of the friction stir weld joint 12. Thus, the sealant 40 can fill the spaces 14 between the faying surfaces 24, 26 of the structural members 20, 22. The sealant 40 prevents chemicals, moisture, debris, and other substances from entering the spaces 14, and the sealant 40 thereby prevents corrosion or other damage that can be caused by those substances.

Preferably, the sealant 40 is formed of a material that can be chemically reacted exothermically. Such exothermically reactable materials can include beryllium, nickel, aluminum, boron, copper, magnesium, molybdenum, palladium, rhodium, silicon, titanium, zirconium, and the like. For example, the sealant 40 can be formed of compounds or mixtures of titanium and boron; aluminum, nickel, and copper; nickel and aluminum; zirconium and aluminum; nickel and silicon; molybdenum and silicon; palladium and aluminum; rhodium and aluminum; titanium and aluminum; and the like. In particular, the sealant 40 can be $ZrAl_3$, $ZrAl_2$, TiAl, a mixture of titanium and boron, or various other exothermically reactable compounds, mixtures, and materials containing elements listed above and/or others. The sealant 40 can also include various chemicals, e.g., to prevent or reduce oxidation of metals in the sealant 40 and/or to at least temporarily bind the members 20, 22 so that a better metallic bond results in the joint 10.

The energy released during the exothermic reaction can be sufficient for sustaining the reaction so that once the reaction is initiated, all or substantially all of the sealant 40 in the interface 28 reacts. The exothermic reaction of the sealant 40 can also be sufficient for melting the sealant 40 and/or portions of the structural members 20, 22, depending on the maximum reaction temperature of the sealant 40 and the melting temperature of the structural members 20, 22. For example, in one embodiment of the present invention, the structural members 20, 22 are formed of aluminum or aluminum alloys and are sealed by a sealant 40 that reaches a maximum temperature of between about 1200° F. and 2000° F. during the exothermic reaction. In another embodiment, structural members 20, 22 formed of titanium or titanium alloys are sealed by a sealant 40 that reaches a maximum temperature of between about 2000° F. and 3500° F. during the exothermic reaction. Unalloyed aluminum and titanium melt at temperatures of about 1220° F. and 3270° F., respectively. Therefore, in some cases, the sealant 40 partially melts the structural members 20, 22 at the interface 28 and forms a diffusion bond therewith. Alternatively, if the reaction temperature is less than the melting temperature of the structural members 20, 22, the sealant 40 can be melted to fill the interface 28 without melting the structural members 20, 22.

In either case, the sealant 40 can substantially fill the interface 28, thereby sealing the interface 28 and preventing the entry of debris, moisture, and the like. Further, the sealant 40 can be joined to the structural members 20, 22 forming a joint therebetween. If the sealant 40 is reacted before friction welding of the structural members 20, 22, the joint formed by the sealant 40 can hold the structural members 20, 22 in place while friction welding is performed. Further, regardless of when the sealant 40 is reacted, the joint formed by the sealant 40 can enhance the strength of the overall joint 10 between the structural members 20, 22. That is, the sealant 40 can connect the structural members 20, 22 over a portion of the interface 28 that is not joined by friction welding, thereby supplementing the strength of the friction weld joint 12.

The sealant 40 can be formed and disposed as a film, a paste, a powder, and the like. For example, the sealant 40 can be formed as a foil or film having tens, hundreds, or thousands of layers. Alternatively, the sealant 40 can be formed as a paste or other fluid, such as a powder suspended in a plasticizer fluid. Further, the sealant 40 can be disposed as a film, powder, fluid, or the like onto or in a substrate 42 that is subsequently used to dispose the sealant 40 onto one or both of the faying surfaces 24, 26. As illustrated in FIG. 3, the substrate 42 can be a thin, flexible, tape-like sheet of polymer or paper material. Alternatively, the substrate 42 can be a porous or gauze-like material, which can at least partially absorb the sealant 40 therein. As shown in FIG. 3, the sealant 40 can be disposed as a layer having uniform thickness on the substrate 42, and the substrate 42 can then be coiled to form a roll 44. Subsequently, the substrate 42 can be unrolled and placed on one or both of the structural members 20, 22 with the sealant 40 between the member 20, 22 and the substrate 42. In other embodiments, the sealant 40 can be disposed on the substrate 42 as the substrate 42 is dispensed from a coil and/or by a feeder device, with the substrate 42 then being positioned on the structural member(s) 20, 22. As shown in FIG. 3, the substrate 42 can be peeled from the member 22 in a direction 43, leaving the sealant 40 on the faying surface 26. Alternatively, the structural members 20, 22 can be configured for joining with the substrate 42 therebetween, and the substrate 42 can be combusted or otherwise destroyed during the exothermic reaction of the sealant 40 and/or friction welding of the structural members 20, 22.

The amount of sealant 40 disposed on the faying surfaces 24, 26 can vary, but in one embodiment of the invention, a layer of between about 0.0005 and 0.020 inches is disposed. The sealant 40 can be disposed over all or part of the faying surfaces 24, 26, including the portion of the interface 28 that is welded to form the friction weld joint 12 of the joint 10, although in some cases the sealant 40 may positively or negatively affect certain mechanical properties of the friction weld joint 12.

The exothermic reaction of the sealant 40 can be initiated before, during, or after the structural members 20, 22 are friction welded to form the weld joint 12. For example, according to one embodiment of the present invention, the sealant 40 is disposed on the faying surfaces 24, 26, the structural members 20, 22 are positioned so that the faying surfaces 24, 26 are opposed to define the interface 28 therebetween, and the exothermic reaction is then initiated. Initiation of the exothermic reaction can be achieved by heating the sealant 40, providing a chemical catalyst, or the like. For example, an oven, flame, laser, or the like can be used to heat all or part of the sealant 40 and/or the structural members 20, 22 to an initiation temperature of the sealant 40 at which the exothermic reaction begins to take place. As noted above, in some embodiments the exothermic reaction releases sufficient thermal energy to sustain the reaction, and therefore no additional energy need be supplied. In other embodiments, however, the reaction is exothermic but does not release sufficient thermal energy to be self-sustaining, and therefore additional energy must be supplied, e.g., with the oven, flame, laser, or the like. If the exothermic reaction is self-sustaining, the reaction typically occurs quickly once initiated. Friction welding can then be performed as described above.

In other embodiments of the invention, the friction welding can be performed at least partially during the exothermic reaction. In particular, the sealant 40 can be disposed, the structural members 20, 22 can be positioned to define the interface 28, and the friction welding can then be performed such that the friction welding provides sufficient thermal energy to initiate the exothermic reaction. The exothermic reaction can then occur at a rate that is equal to or different than the rate of the friction welding. For example, once initiated, the exothermic reaction of the sealant 40 may finish within a few seconds or less, while the friction welding continues at a slower rate.

Alternatively, if the friction welding does not provide sufficient thermal energy to initiate the exothermic reaction of the sealant 40, the sealant 40 can be reacted after the friction welding has begun or ended. For example, according to one embodiment of the invention, the sealant 40 is disposed on the faying surfaces 24, 26, the structural members 20, 22 are positioned with the faying surfaces 24, 26 opposed to form the interface 28 therebetween, and the friction weld joint 12 is formed. Subsequent to forming at least part of the friction weld joint 12, the sealant 40 is exothermically reacted to form the seal in the interface 28.

Preferably, the sealant 40 substantially fills the interface 28 and thereby seals the interface 28 to prevent moisture and debris from entering the interface 28. Further, as shown in FIG. 2, the sealant 40 can form a seal 46 that extends outside the interface 28, e.g., at one or more edges of the interface 28 to further protect the interface 28 from corrosion or other damage to the structural members 20, 22. In this regard, the sealant 40 can be disposed outside the interface 28. For example, if the sealant 40 is disposed as a foil or paste-like fluid, the sealant 40 can be disposed on portions of the structural members 20, 22 that are extend beyond the area of the faying surfaces 24, 26. According to one embodiment of the present invention, the sealant 40 is disposed as a paste onto the faying surfaces 24, 26, and the structural members 20, 22 are positioned with the faying surfaces 24, 26 in an opposed configuration to define the interface 28. The structural members 20, 22 are then urged together, for example, by clamping the structural members 20, 22 together. The paste sealant 40 substantially fills the interface 28 and some of the sealant 40 is squeezed from the interface 28 at the edges of the interface 28. Excess paste sealant 40 can be removed from the edges of the interface 28, but some sealant 40 is left outside the interface 28. Thus, when the paste sealant 40 is reacted, a bead of sealant 40 at the edge of the interface 28 forms a fillet seal 46. In other embodiments of the present invention, such a fillet seal 46 can alternatively be formed using conventional sealants, such as a caulk-like or resinous material.

As illustrated in FIG. 4, a braze material 48 can also be provided in the interface 28 with the sealant 40 before the sealant 40 is reacted to form a braze joint between the structural members 20, 22. Typically, the braze material 48 is characterized by a melting temperature that is lower than the melting temperature of the structural members 20, 22. Thus, the particular braze material 48 for a particular joint 10 can be selected according to the materials of the structural members 20, 22 and the sealant 40. For example, the braze material 48 can include bronze, copper, aluminum, and/or nickel. The braze material 48 can be provided as part of the foil, paste, powder, or other constitution of the sealant 40. For example, thin sheets of the braze material 48 can be layered within the foil of the sealant 40, or particles of the braze material 48 can be mixed with a sealant 40 that is a powder or paste. Thus, the braze material 48 can be disposed onto one or both of the faying surfaces 24, 26 together with the sealant 40. Alternatively, the braze material 48 can be provided separately in the interface 28, e.g., as a separate sheet that is layered with the foil sealant 40, as a powder or paste that is disposed on the faying surface opposite the sealant 40, or otherwise. In any case, the sealant 40 can have a reaction temperature that is higher than the melting temperature of the braze material 48, and the sealant 40 can be disposed in a quantity such that sufficient heat is released during the exothermic reaction to melt the braze material 48 so that the braze material 48 is brazed or otherwise bonded to the structural members 20, 22, thereby joining the structural members 20, 22. Before, during, or after the exothermic reaction of the sealant 40 and, hence, the joining of the structural members 20, 22 by the braze material 48, the joint 12 can be formed, as described above, e.g., by friction stir welding. Thus, the braze material 48 enhances the strength of the joint 10 between the structural members 20, 22.

FIG. 5 illustrates the operations for forming a joint according to one embodiment of the present invention. It is understood that some of the operations can be omitted from the method, and additional operations can be performed, without departing from the scope of the present invention. As indicated in Block 100, a sealant is disposed in an interface defined by first and second faying surfaces of at least one structural member. The sealant can be disposed as a foil or fluid, and can be disposed with a substrate. The sealant can be disposed with a thickness of between about 0.0005 and 0.020 inches and can fill, or substantially fill, the entire interface. Further, some of the sealant can be disposed outside the interface, e.g., by squeezing the members together after disposing the sealant, so that the sealant forms a fillet seal outside the interface. In some embodiments of the invention, a braze material is also disposed in the interface with the sealant. See Block 110. An exothermic reaction of the sealant is initiated so that the sealant at least partially seals the interface between the faying surfaces. See Block 120. For example, the reaction can be initiated by heating the sealant to an initiation temperature. In one embodiment, the exothermic reaction is characterized by a maximum temperature of at least about 1200° F. The at least one structural member is welded or otherwise connected to form a joint between the first and second faying surfaces, the joint being at least partially sealed by the sealant. See Block 130. For example, the structural member(s) can be friction stir welding. The friction welding can initiate the exothermic reaction of the sealant, or the sealant can be reacted before or after the friction welding. Alternatively, the structural member(s) can be welded by any other welding technique such as laser welding or arc welding and, more particularly, gas tungsten arc welding, tungsten inert gas welding, plasma arc welding, or the like. Further, the structural members can also be joined without welding, for example, by soldering, brazing, or disposing connectors or fasteners such as rivets, bolts, screws, or clips between the structural members.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a weld joint the method comprising:
   disposing a sealant in an interface defined by first and second faying surfaces of at least one structural member;
   initiating an exothermic reaction in the sealant such that the sealant at least partially seals the interface between the faying surfaces; and
   friction stir welding the at least one structural member by rotating a friction stir welding pin and urging the pin through the interface to form a joint between the first and second faying surfaces, the joint being at least partially sealed by the sealant.

2. A method according to claim 1 further comprising providing the sealant, the sealant comprising at least one of the group consisting of aluminum, nickel, and oxygen.

3. A method according to claim 1 wherein said initiating step comprises filling substantially the entire interface with the sealant.

4. A method according to claim 1 wherein said friction stir welding step comprises providing the friction stir welding pin extending from a shoulder and urging the shoulder against the at least one structural member to thereby urge the pin through the interface and friction stir weld the at least one structural member.

5. A method according to claim 1 wherein said friction welding step comprises urging a friction welding tool Through the faying surfaces in a direction substantially perpendicular to the interface.

6. A method according to claim 1 wherein said disposing step comprises disposing the sealant as a foil between the faying surfaces.

7. A method according to claim 6 further comprising forming the sealant, said forming step comprising layering a plurality of laminar sheets of the sealant to form a multilayer foil.

8. A method according to claim 1 wherein said disposing step comprises disposing the sealant as a fluid on at least one of the faying surfaces.

9. A method according to claim 8 further comprising providing the sealant as the fluid, the fluid including a plasticizer.

10. A method according to claim 1 further comprising providing the sealant on a substrate, and wherein said disposing step comprises disposing the sealant and the substrate onto at least one of the faying surfaces.

11. A method according to claim 10 further comprising removing the substrate from the faying surface prior to said friction welding step such tat the sealant remains on the faying surface.

12. A method according to claim 1 wherein said initiating step comprises heating the sealant to an initiation temperature of the sealant and thereby initiating the exothermic reaction of the sealant.

13. A method according to claim 1 wherein said initiating step is performed prior to said friction welding step such tat the exothermic reaction of the sealant substantially terminates before the sealant is friction welded.

14. A method according to claim 1 wherein said initiating step is performed concurrently with said friction welding step.

15. A method according to claim 14 wherein said initiating step comprises heating the sealant to an initiation temperature of the sealant by friction stir welding.

16. A method according to claim 1 wherein said initiating step is performed subsequent to said friction welding step.

17. A method according to claim 1 further comprising providing the at least one structural member, the structural member comprising at least one of the group consisting of aluminum, aluminum alloys, titanium, titanium alloys, and steel.

18. A method according to claim 1 further comprising disposing a braze material in the interface, the braze material having a melting temperature lower than a melting temperature of the structural member and the braze material being at least partially bonded to the faying surfaces during an exothermic reaction of the sealant.

19. A method according to claim 18 further comprising providing the braze material, the braze material comprising at least one of the group consisting of bronze, copper, aluminum, and nickel.

20. A method according to claim 1 wherein said initiating step comprises initiating an exothermic reaction of the sealant, the reaction having a maximum temperature of at least about 1200° F.

21. A method according to claim 1 wherein said disposing step comprises disposing the sealant having a thickness of between about 0.0005 and 0.020 inches.

22. A method according to claim 1 wherein said initiating step comprises reacting at least some of the sealant outside the interface to form a fillet seal on at least one edge of the interface.

23. A method according to claim 1 further comprising urging said faying surfaces together before said initiating step such that some of the sealant is squeezed from the interface and subsequently exothermically reacted to form a seal on at least one edge of the interface.

24. A method of forming a joint between at least one structural member, the method comprising:
   providing the sealant on a substrate;
   disposing a sealant and the substrate onto at least one of first arid second faying surfaces of the at least one structural member and removing the substrate from the Laying surface such that the sealant remains on the faying surface in an interface defined by the first and second faying surfaces of the at least one structural member;
   initiating an exothermic reaction in the sealant such that the sealant at least partially seals the interface between the faying surfaces; and
   joining the at least one structural member after said removing step to form a joint between the first and second faying surfaces, the joint being at least partially scaled by the sealant.

25. A method according to claim 24 further comprising providing the sealant, the sealant comprising at least one of the group consisting of aluminum, nickel, arid oxygen.

26. A method according to claim 24 wherein said initiating step comprises filling substantially the entire interface with the sealant.

27. A method according to claim 24 wherein said joining step comprises welding the structural members at the interface for form a weld joint between the structural members.

28. A method according to claim 27 wherein said welding step comprises at least one of the group consisting of arc welding and laser welding.

29. A method according to claim 27 wherein said initiating step comprises heating the sealant to an initiation temperature of the sealant by said welding step.

30. A method according to claim 24 wherein said joining step comprises disposing at least one connector through the interface to join the structural members.

31. A method according to claim 24 wherein said disposing step comprises disposing the sealant as a foil between the faying surfaces.

32. A method according to claim 31 further comprising forming the sealant, said forming step comprising layering a plurality of laminar sheets of the sealant to form a multilayer foil.

33. A method according to claim 24 wherein said disposing step comprises disposing the sealant as a fluid on at least one of the faying surfaces.

34. A method according to claim 33 further comprising providing the sealant as the fluid, the fluid including a plasticizer.

35. A method according to claim 24 wherein said initiating step comprises heating the sealant to an initiation temperature of the sealant and thereby initiating the exothermic reaction of the sealant.

36. A method according to claim 24 wherein said initiating step is performed prior to said joining step.

37. A method according to claim 24 wherein said initiating step is performed subsequent to said joining step.

38. A method according to claim 24 further comprising providing the at least one structural member, the structural member comprising at least one of the group consisting of aluminum, aluminum alloys, titanium, titanium alloys, and steel.

39. A method according to claim 24 further comprising disposing a braze material in the interface, the braze material having a melting temperature lower than a melting temperature of the structural member and the braze material being at least partially bonded to the faying surfaces during an exothermic reaction of the sealant.

40. A method according to claim 39 further comprising providing the braze material, the braze material comprising at least one of the group consisting of bronze, copper, aluminum, and nickel.

41. A method according to claim 24 wherein said initiating step comprises initiating an exothermic reaction of the sealant, the reaction having a maximum temperature of at least about 1200° F.

42. A method according to claim 24 wherein said disposing step comprises disposing the sealant having a thickness of between about 0.0005 and 0.020 inches.

43. A method according to claim 24 wherein said initiating step comprises reacting at least some of the sealant outside the interface to form a fillet seal on at least one edge of the interface.

44. A method according to claim 24 further comprising urging said faying surfaces together before said initiating step such that some of the sealant is squeezed from the interface and subsequently exothermically reacted to form a seal on at least one edge of the interface.

45. A method of forming a joint between at least one structural member, the method comprising:

disposing a sealant in an interface defined by first and second faying surfaces of the at least one structural member;

initialing an exothermic reaction in the sealant such that the sealant at least partially seals the interface between the faying surfaces; and welding the at least one structural member at the interface to form a weld joint between the first and second faying surfaces of the structural members, the weld joint being at least partially sealed by the sealant, wherein said initiating step is performed at a time that is non-concurrent it with said welding step.

46. A method according to claim 45 further comprising providing the sealant, the sealant comprising at least one of the group consisting of aluminum, nickel, and oxygen.

47. A method according to claim 45 wherein said initiating step comprises filling substantially the entire interface with the sealant.

48. A method according to claim 45 wherein said welding step comprises at least one of the group consisting of arc welding and laser welding.

49. A method according to claim 45 wherein said disposing step comprises disposing the sealant as a foil between the faying surfaces.

50. A method according to claim 49 further comprising forming the sealant, said forming step comprising layering a plurality of laminar sheets of the sealant to form a multilayer foil.

51. A method according to claim 45 wherein said disposing step comprises disposing the sealant as a fluid on at least one of the faying surfaces.

52. A method according to claim 51 further comprising providing die sealant as the fluid, the fluid including a plasticizer.

53. A method according to claim 45 further comprising providing the sealant on a substrate, and wherein said disposing step comprises disposing the sealant and the substrate onto at least one of the faying surfaces.

54. A method according to claim 45 wherein said initiating step comprises heating the sealant to an initiation temperature of the sealant and thereby initiating the exothermic reaction of the sealant.

55. A method according to claim 45 wherein said initiating step is performed prior to said welding step.

56. A method according to claim 45 wherein said initiating step is performed subsequent to said welding step.

57. A method according to claim 45 further comprising providing the at least one structural member, the structural member comprising at least one of the group consisting of aluminum1 aluminum alloys, titanium, titanium alloys, and steel.

58. A method according to claim 45 further comprising disposing a braze material in the interface, the braze material having a melting temperature lower than a melting temperature of the structural member and the braze material being at least partially bonded to the faying surfaces during an exothermic reaction of the sealant.

59. A method according to claim 58 further comprising providing the braze material, the braze material comprising at least one of the group consisting of bronze, copper, aluminum, and nickel.

60. A method according to claim 45 wherein said initiating step comprises initiating an exothermic reaction of the sealant, the reaction having a maximum temperature of at least about 1200° F.

61. A method according to claim 45 wherein said disposing step comprises disposing the sealant having a thickness of between about 0.0005 and 0.020 inches.

62. A method according to claim 45 wherein said initiating step comprises reading at least some of the sealant outside the interface to form a fillet seal on at least one edge of the interface.

63. A method according to claim 45 further comprising urging said faying surfaces together before said initiating step such that some of the sealant is squeezed from the interface and subsequently exothermically reacted to form a seal on at least one edge of the interface.

* * * * *

UNITED STATES PATENT AND TRADEMARK OFFICE
CERTIFICATE OF CORRECTION

PATENT NO. : 7,090,112 B2  Page 1 of 1
APPLICATION NO. : 10/657775
DATED : August 15, 2006
INVENTOR(S) : Masingale It is certified that error appears in the above-identified patent and that said Letters Patent is hereby corrected as shown below:

Column 9,
Line 41, "Through" should read --through--;
Line 62, "tat" should read --that--.

Column 10,
Line 2, "tat" should read --that--;
Line 47, "a" should read --the--;
Line 48, "arid" should read --and--;
Line 50, "Laying" should read --faying--;
Line 61, "scaled" should read --sealed--;
Line 64, "arid" should read --and--.

Column 12,
Line 4, "initialing" should read --initiating--;
Line 34, "die" should read --the--;
Line 51, "aluminum1" should read --aluminum,--.

Column 13,
Line 5, "reading" should read --reacting--.

Signed and Sealed this

Second Day of January, 2007

JON W. DUDAS
*Director of the United States Patent and Trademark Office*